Feb. 12, 1935. A. PELLOW ET AL 1,991,116
OPHTHALMIC LENS AND PROCESS OF MAKING THE SAME
Filed Aug. 11, 1933
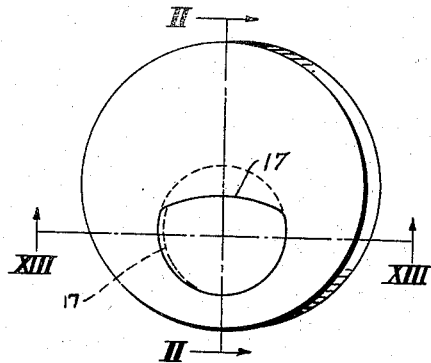
FIG. I.
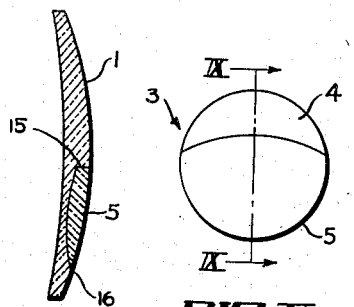
FIG. II. FIG. V.
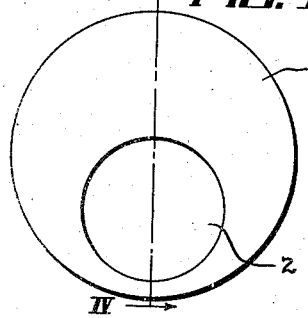
FIG. III.
FIG. VI.
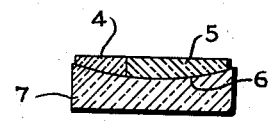
FIG. VIII.
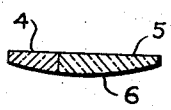
FIG. VII.
FIG. IV.
FIG. IX.
FIG. XI.
FIG. X. FIG. XIII.
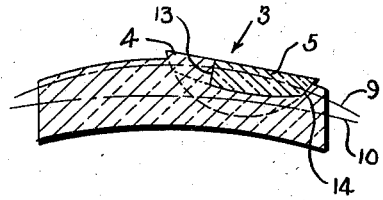
FIG. XII.
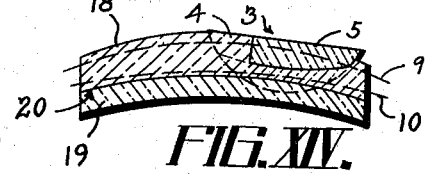
FIG. XIV.
INVENTOR
ARTHUR PELLOW.
LLOYD W. GODDU.
BY
Harry H. Styll
ATTORNEY Patented Feb. 12, 1935

1,991,116

UNITED STATES PATENT OFFICE 1,991,116

OPHTHALMIC LENS AND PROCESS OF MAKING THE SAME

Arthur Pellow and Lloyd W. Goddu, Southbridge, Mass., assignors to American Optical Company, Southbridge, Mass., a voluntary association of Massachusetts Application August 11, 1933, Serial No. 684,672

19 Claims. (Cl. 88—54)

This invention relates to improvements in ophthalmic lenses and has particular reference to a bifocal or multifocal lens and process of making the same.

One of the principal objects of the invention is to provide an improved segment for a bifocal or multifocal lens having embodied therein a prism correction and process of making the same.

Another object of the invention is to provide means for controlling the amount of prism correction in the segment and for controlling the position of said prism correction.

Another object is to provide means and process of controlling the amount and position of a prism correction in an odd shaped segment.

Another object is to provide simple, efficient and economical means of producing bifocal or multifocal lenses having incorporated therein a plurality of advantageous features which have hitherto been difficult to obtain in lenses of this character.

Other objects and advantages of the invention will become apparent from the following description taken in connection with the accompanying drawing and it will be understood that many changes may be made in the details of construction, arrangement of parts and steps of the process shown and described without departing from the spirit of the invention as expressed in the accompanying claims. We, therefore, do not wish to be limited to the exact details of construction and steps of the process shown and described as the preferred forms only have been shown by way of illustration.

Referring to the drawing:

Fig. I is a perspective view of a finished lens embodying the invention;

Fig. II is a sectional view taken on line II—II of Fig. I;

Fig. III is a front elevation of a major blank showing a step in the process of manufacture;

Fig. IV is a sectional view taken on line IV—IV of Fig. III;

Fig. V is a plan view of the button;

Fig. VI is a sectional view of a portion of the button illustrating a step in the process of manufacture;

Fig. VII is a view similar to Fig. VI showing another step in the process of manufacture;

Fig. VIII is a view similar to Fig. VII showing another step in the process of manufacture;

Fig. IX is a section taken on line IX—IX of Fig. V showing the finished button;

Fig. X is a sectional view showing the segment loosely positioned in the countersink in the major blank and illustrating how the position of said segment may be varied therein to control the prism correction of said segment;

Fig. XI is a view similar to Fig. X showing diagrammatically how a feather edge segment may be formed;

Fig. XII is a view similar to Fig. XI showing how a cliff edge segment may be formed; and Fig. XIII is a sectional view taken on line XIII—XIII of Fig. I illustrating how the prismatic effect is obtained in the segment of the finished lens.

Fig. XIV is a view similar to Fig. XI showing a modified form of the invention.

In the past it has been a difficult and expensive matter to incorporate a prism correction in the segment of a bifocal or multifocal lens as it necessitated in most instances the grinding and polishing of a spherical recess in a body of glass on an eccentric axis. It was also difficult and expensive to regulate and control the amount and position of the required prism correction. The above is true in the case of regular circular shaped segments and in instances such as the present case requiring an irregular shaped segment the difficulty and expense is increased.

A principal object, therefore, of the present invention is to provide simple, efficient and economical means of providing a segment for a bifocal or multifocal lens in which a prism correction may be quickly and easily incorporated therein and the amount and position of said prism may be definitely controlled regardless of the contour shape of the segment.

Referring to the drawing in which similar reference characters denote corresponding parts throughout the several views, a major lens blank 1 of crown or similar glass of a low index of refraction, as shown in Figures III and IV, is formed with a countersink 2 therein, the curve of said countersink being preferably spherical and of any suitable radius.

The button 3 as shown in Figures V to IX inclusive is formed of two separate pieces of glass 4 and 5 fused together edge to edge, the portion 4 being of substantially the same glass and index of refraction as the major blank 1, and the portion 5 being of a different glass and of a different index of refraction. The portions 4 and 5 are provided on one face thereof with a continuous curve 6 of a predetermined radius, the curvature of which is one of the controlling factors of the finished power of the segment in the finished lens.

A separate piece of glass 7 of substantially the same glass and index of refraction as the major blank 1 and portion 4 is fused or otherwise secured to the finished surface 6. The composite button 3 as shown in Fig. VIII is provided on one face thereof with a continuous spherical curve 8, the curvature of which is substantially the same radius as the curve of the countersink 2. The said composite button 3 is placed in the countersink 2, as shown in Fig. X, and is rocked about the center of the curve of the countersink, as illustrated by the dotted lines, to tilt the surface 6 of the segment portion 5 to varying angular positions relative to the axis of the curve of said countersink. The purpose of this arrangement is to provide means for controlling the prism power in the finished reading portion of the lens and to control the position and amount of said prism correction. When the composite button 3 is in desired adjusted relation with the major blank 1 the said button is fused or otherwise secured to the blank. It is apparent that the portions 4 and 8 which are of substantially the same index of refraction as the major portion 1 will blend therewith when the parts are fused together and the abutting surfaces of said portions will disappear leaving only the portion 5 which is of a different index of refraction visible.

The segment side of the lens is first finished to the required optical surface 9 as shown by the dot and dash line in Figures XI and XII. The position of the optical center of the segment or the prism power of said segment may be varied in some instances after the button 3 has been fused within the countersink 2 by grinding the optical surface 9 at different angles relative to the surface 6 on the segment portion 5. The prescription surface indicated by the dot and dash line 10 is placed on the other side of the blank to form the finished lens. In Fig. XI the segment 5 is tilted to form a thick edge 11 adjacent the side nearest the center of the major blank 1 and a feather or knife edge 12 on the opposite side thereof when the curve 9 is formed.

In Fig. XII the segment 5 is tilted to form a thick edge 13 adjacent the side nearest the center of the major blank 1 and a relatively thick edge 14 on the opposite side thereof when the curve 9 is formed.

The term prism in the segment 5 as set forth above simply means that the segment instead of being symmetrical is of a wedge shape. In Fig. II it will be noted that the segment at the edge 15 is thicker than at the edge 16. The segment then has a prism with base up or base at 15. The effect of a prism optically is to bend the rays of light toward the base or thicker portion of the prism. It is clear that if the segment is provided with thickness at its edges as shown in Figures XI and XII there is provided sufficient material to grind off the segment in an angular direction if desired so that it is thicker on one edge than the other. The amount of prism is dependent on the difference in thickness of the edges and the prism may be positioned by placing the thick edge as desired with respect to the rest of the lens. In Figures I and XIII the base or thick edge 17 is shown on the side of the segment. This base may be placed up, down, in or out, as desired, by tilting the button 3 the desired amount as shown in Fig. X. The direction of displacement of light which, normally is in the direction of the base or thick edge of the prism, can therefore be controlled by the adjustment of said thick edge as set forth above.

In Fig. XIV there is shown a slight modification wherein instead of forming the major blank of a single piece of glass 1 as shown in Fig. IV, the said blank is formed of two pieces of glass 18 and 19 which are cemented together along their abutting surfaces 20. The glass 18 is relatively expensive glass and 19 is cheap glass. The countersink 2 and segment 3 are then formed in a manner similar to that previously described. The segment is fused in the countersink and the piece of glass 19 is ground away to form the prescription curve 10 on the lens as shown in Fig. XIV. The said curve when finished lies on the glass 18.

One of the objects of employing this method is to provide means whereby the amount of expensive glass 18, which forms the major field of the lens, may be reduced and the wastage thereof decreased.

The piece of glass 19 may, if desired, be removed from the glass 18 after the countersink 2 has been formed and the segment 3 may be fused in the piece of glass 18. In this instance the piece of glass 19 merely acts as a support for preventing the glass 18 at the bottom edge of the countersink from chipping or flaking during the forming of the countersink. By heating the glass slightly after the countersink is formed the cement may be softened and the piece 19 removed. This obviates the necessity of having to grind away the piece 19 and thereby greatly reduces the labor and expense in forming such articles.

From the foregoing description it will be seen that simple, efficient and economical means and process has been provided wherein the amount and position of the prism correction of the segment of a bifocal or multifocal lens may be controlled.

Having described our invention, we claim:

1. A segment button for use with a major portion of a bifocal or multifocal lens having a seat to receive said button, comprising superimposed layers of glass, one layer having a plurality of sections of glass of more than one index of refraction secured together edge to edge and having over one face a curved optical surface of required power and the other layer being of glass of the same index of refraction as the major portion of the lens, and having one face fitted to the curved optical surface of the first layer, and the other face having a surface to fit the seat of the said major portion.

2. The process of making a multifocal or bifocal lens comprising, making a major portion of a lens of a glass of one index of refraction with a segment seat thereon, making a segment button for said seat by fusing together edge to edge a plurality of pieces of glass of more than one index of refraction, surfacing one face of the composite piece to a surface of required power, surfacing one face of another piece of glass of same index of refraction as the major portion to fit the surfaced face of the composite piece, fusing the fitted portions together, surfacing the outer face of the last piece to fit the seat of the major portion, fusing the said fitted parts together, and finishing the two faces of the whole composite blank to optical surfaces to produce a lens of required power.

3. The process of making a multifocal or bifocal lens comprising, making a major portion of a lens of a glass of one index of refraction with a segment seat thereon, making a segment button for said seat by fusing together edge to edge a plurality of pieces of glass of more than one index of refraction, surfacing one face of the composite piece to a surface of required power, surfacing one face of another piece of glass of the same index of refraction as the major portion to fit the surfaced face of the composite piece, fusing the fitted portions together, surfacing the outer face of the last piece to fit the seat of the major portion and fusing the said fitted parts together.

4. The process of making a multifocal or bifocal lens comprising, making a major portion of a lens of a glass of one index of refraction with a segment seat thereon, making a segment button for said seat by fusing together edge to edge a plurality of pieces of glass of more than one index of refraction, surfacing one face of the composite piece to a surface of required power, surfacing one face of another piece of glass of the same index of refraction as the major portion to fit the surfaced face of the composite piece, fusing the fitted portions together, surfacing the outer face of the last piece to fit the seat of the major portion, fusing the said fitted parts together and finishing the button side of the composite blank to a continuous optical surface.

5. The process of making a multifocal or bifocal lens comprising, making a major portion of a lens of a glass of one index of refraction with a segment seat thereon, making a segment button for said seat by fusing together edge to edge a plurality of pieces of glass of more than one index of refraction, surfacing one face of the composite piece to a surface of required power, surfacing one face of another piece of glass of the same index of refraction as the major portion to fit the surfaced face of the composite piece, fusing the fitted portions together, surfacing the outer face of the last piece to fit the seat of the major portion, tilting the axis of the composite button with respect to the axis of the seat in desired direction and amount, and fusing the composite button so positioned to the seat.

6. The process of making a multifocal or bifocal lens comprising making a major portion of a lens of a glass of one index of refraction with a segment seat thereon, making a segment button for said seat by fusing together edge to edge a plurality of pieces of glass of more than one index of refraction, surfacing one face of the composite piece to a surface of required power surfacing one face of another piece of glass of the same index of refraction as the major portion to fit the surfaced face of the composite piece, fusing the fitted portions together, surfacing the outer face of the last piece to fit the seat of the major portion, tilting the axis of the composite button with respect to the axis of the seat in desired direction and amount, and fusing the composite button so positioned to the seat, and finishing the button side of the whole composite blank to a continuous optical surface.

7. The process of making a multifocal or bifocal lens comprising making a major portion of a lens of a glass of one index of refraction with a segment seat thereon, making a segment button for said seat by fusing together edge to edge a plurality of pieces of glass of more than one index of refraction, surfacing one face of the composite piece to a surface of required power, surfacing one face of another piece of glass of the same index of refraction as the major portion to fit the surfaced face of the composite piece, fusing the fitted portions together, surfacing the outer face of the last piece to fit the seat of the major portion, tilting the axis of the composite button with respect to the axis of the seat in desired direction and amount, and fusing the composite button so positioned to the seat, and finishing the two faces of the whole composite blank to optical surfaces to make a finished lens of required power.

8. The process of making a multifocal or bifocal lens comprising making a major portion of a lens of a glass of one index of refraction with a segment seat thereon, securing a layer of different kind of glass to the major portion on the side opposite the seat, making a segment button for said seat by fusing together edge to edge a plurality of pieces of glass of more than one index of refraction, surfacing one face of the composite piece to a surface of required power, surfacing one face of another piece of glass of the same index of refraction as the major portion to fit the surfaced face of the composite piece, fusing the fitted portions together, surfacing the outer face of the last piece to fit the seat of the major portion and fusing the said fitted parts together.

9. A multifocal or bifocal lens having a major portion having a seat thereon, and a button, comprising superimposed layers of glass, one layer having over one face a curved optical surface of required power and the other layer being of glass of the same index of refraction as the major portion of the lens, and having one face fitted to the curved optical surface of the first layer, and the other face having a surface fitting the seat of the said major portion and the axis of said button inclined to the axis of the seat.

10. The process of making a multifocal or bifocal lens comprising making a major portion of a lens of a glass of one index of refraction with a segment seat thereon, making a segment button for said seat of a piece of glass of different index of refraction than the major portion, surfacing one face of the button to a surface of required power, surfacing one face of another piece of glass of the same index of refraction as the major portion to fit the surfaced face of the button, fusing the fitted portions together, surfacing the outer face of the last piece to fit the seat of the major portion, fusing the said fitted parts together and finishing the two faces of the whole composite blank to optical surfaces to produce a lens of required power.

11. The process of making a multifocal or bifocal lens comprising making a major portion of a lens of a glass of one index of refraction with a segment seat thereon, making a segment button for said seat of a piece of glass of a different index of refraction than the major portion, surfacing one face of the segment button to a surface of required power, surfacing one face of another piece of glass of the same index of refraction as the major portion to fit the surfaced face of the segment button, fusing the fitted portions together, surfacing the outer face of the last piece to fit the seat of the major portion and fusing the said fitted parts together.

12. The process of making a multifocal or bifocal lens comprising making a major portion of a lens of a glass of one index of refraction with a segment seat thereon, making a segment button for said seat of a piece of glass of different index of refraction than the major portion surfacing one face of the segment button to a surface of required power, surfacing one face of another piece of glass of the same index of refraction as the major portion to fit the surfaced face of the button, fusing the fitted portions together, surfacing the outer face of the last piece to fit the seat of the major portion, fusing the said fitted parts together and finishing the button side of the composite blank to a continuous optical surface.

13. The process of making a multifocal or bifocal lens comprising making a major portion of a lens of a glass of one index of refraction with a segment seat thereon, making a segment button for said seat of a piece of glass of different index of refraction than the major portion, surfacing one face of the segment button to a surface of required power, surfacing one face of another piece of glass of the same index of refraction as the major portion to fit the surfaced face of the button, fusing the fitted portions together, surfacing the outer face of the last piece to fit the seat of the major portion, fusing the said fitted parts together and finishing the two faces of the whole composite blank to optical surfaces to make a finished lens of required power.

14. The process of making a multifocal or bifocal lens comprising making a major portion of a lens of a glass of one index of refraction with a segment seat thereon, making a segment button for said seat of a piece of glass of a different index of refraction than the major portion, surfacing one face of the segment button to a surface of required power, surfacing one face of another piece of glass of the same index of refraction as the major portion to fit the surfaced face of the segment button, fusing the fitted portions together, surfacing the outer face of the last piece to fit the seat of the major portion, tilting the axis of the segment button with respect to the axis of the seat in desired direction and amount and fusing the segment button so positioned to the seat.

15. The process of making a multifocal or bifocal lens comprising making a major portion of a lens of a glass of one index of refraction with a segment seat thereon, making a segment button for said seat of a piece of glass of a different index of refraction than the major portion, surfacing one face of the segment button to a surface of required power, surfacing one face of another piece of glass of the same index of refraction as the major portion to fit the surfaced face of the segment button, fusing the fitted portions together, surfacing the outer face of the last piece to fit the seat of the major portion, tilting the axis of the segment button with respect to the axis of the seat in desired direction and amount and fusing the segment button so positioned to the seat, and finishing the button side of the whole composite blank to a continuous optical surface.

16. The process of making a multifocal or bifocal lens comprising making a major portion of a lens of a glass of one index of refraction with a segment seat thereon, making a segment button for said seat of a piece of glass of a different index of refraction than the major portion, surfacing one face of the segment button to a surface of required power, surfacing one face of another piece of glass of the same index of refraction as the major portion to fit the surfaced face of the segment button, fusing the fitted portions together, surfacing the outer face of the last piece to fit the seat of the major portion, tilting the axis of the segment button with respect to the axis of the seat in desired direction and amount and fusing the segment button so positioned to the seat, and finishing the two faces of the whole composite blank to optical surfaces to make a finished lens of required power.

17. The process of making a bifocal or multifocal lens blank comprising forming a seat on a piece of glass, forming a segment to fit said seat of two superimposed pieces of glass of different indices of refraction, the bottom layer having the same index of refraction as the portion having the seat thereon, the layers of said segment being joined on a spherical surface, and the under side of the bottom layer formed to fit the seat, fitting the segment on the seat, tilting the segment in said seat with the radial axis of the segment through its center point at an angle to the radial axis of the seat through its center point, and securing the segment in the seat in this position.

18. The process of making a bifocal or multifocal lens blank comprising forming a curved seat on a major piece of glass, forming a segment to fit in said seat of two superimposed layers of glass, the top layer comprising two pieces joined edge to edge transversely, one piece being of the same index of refraction as the major portion and the other of different index and the bottom layer of a single piece of glass of same index of refraction as the major portion, said two layers joined on a curved uniting surface, and the outer surface of the lower layer surfaced to fit in the seat, fitting the segment in the seat, tilting the segment in said seat with the radial axis of the segment through its center point at an angle to the radial axis of the seat through its central point and securing the segment in the seat in this position.

19. The process of forming a bifocal or multifocal lens comprising forming a seat on a major portion of glass of a given index of refraction, fusing two pieces of glass of different indices of refraction together edge to edge, to form a segment portion, one of said pieces of glass being of substantially the same index of refraction as the major portion, forming a continuous curve over one face of said edge fused pieces of glass, fusing a piece of glass of substantially the same index of refraction as the major portion of glass to the curved surface of the edge fused pieces of glass, forming a continuous curved surface of substantially the same radius as the curve of the seat over the exposed face of said last named piece of glass, placing the composite segment on the seat with the curved surface of the edge fused pieces of glass in desired angular relation with the axis of the curve of the seat and fusing said composite piece of glass on said seat in said relation, forming a continuous curve over the seat side of the major portion and the composite segment on the seat in predetermined angular relation to the axis of the curve of said seat and forming a curved surface over the opposite side of the major portion of glass.

ARTHUR PELLOW.
LLOYD W. GODDU.